(12) United States Patent
Kopietz

(10) Patent No.: US 11,778,199 B2
(45) Date of Patent: *Oct. 3, 2023

(54) SYSTEMS AND METHODS FOR DEFERRED POST-PROCESSES IN VIDEO ENCODING

(71) Applicant: ZeniMax Media Inc., Rockville, MD (US)

(72) Inventor: Michael Kopietz, Frankfurt (DE)

(73) Assignee: ZeniMax Media Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,430

(22) Filed: Oct. 6, 2020

(65) Prior Publication Data

US 2021/0044807 A1 Feb. 11, 2021

Related U.S. Application Data

(63) Continuation of application No. 16/355,200, filed on Mar. 15, 2019, now Pat. No. 10,841,591, which is a
(Continued)

(51) Int. Cl.
*H04N 7/12* (2006.01)
*H04N 19/156* (2014.01)
(Continued)

(52) U.S. Cl.
CPC ......... *H04N 19/156* (2014.11); *H04N 19/117* (2014.11); *H04N 19/42* (2014.11); *H04N 19/85* (2014.11)

(58) Field of Classification Search
CPC .... H04N 19/156; H04N 19/117; H04N 19/85; H04N 19/42; H04N 19/46; H04N 19/132; A63F 13/355
(Continued)

(56) References Cited

U.S. PATENT DOCUMENTS 6,345,279 B1    2/2002  Li et al.
6,788,680 B1 *  9/2004  Perlman ................. H04L 29/06
                                                  370/389
(Continued)

FOREIGN PATENT DOCUMENTS

CN      106034241 A    10/2016
EP        1820281 B2    8/2007
(Continued)

OTHER PUBLICATIONS

Wang, Z. et al., "Image Quality Assessment: From Error Visibility to Structural Similarity," IEEE Transactions on Image Processing, 13(4), pp. 600-612, Apr. 2004.
(Continued)

*Primary Examiner* — Gims S Philippe
(74) *Attorney, Agent, or Firm* — Klarquist Sparkman, LLP

(57) ABSTRACT

Systems and methods for deferring post-process effects in video encoding are disclosed. The systems and methods are capable of calculating the capability of client hardware to defer load, and summing a known load of one or more deferral candidates to evaluate how many post-process deferral candidates are capable of being deferred to client hardware. The systems and methods are also capable of sending an updated deferral list of post-processes to a remote server that can apply the list of deferred post-process candidates during the post-processing phase of a first video frame.

22 Claims, 4 Drawing Sheets

Related U.S. Application Data continuation of application No. 15/958,574, filed on Apr. 20, 2018, now Pat. No. 10,271,055.

(60) Provisional application No. 62/618,498, filed on Jan. 17, 2018, provisional application No. 62/488,526, filed on Apr. 21, 2017.

(51) Int. Cl.
  *H04N 19/85* (2014.01)
  *H04N 19/42* (2014.01)
  *H04N 19/117* (2014.01)

(58) Field of Classification Search
  USPC .................................................. 375/240.02
  See application file for complete search history.

(56) References Cited

U.S. PATENT DOCUMENTS

| | | | |
|---|---|---|---|
| 6,903,662 B2 | 6/2005 | Rix et al. | |
| 7,844,002 B2 | 11/2010 | Lu et al. | |
| 7,890,313 B2* | 2/2011 | Kita | G16B 15/00 |
| | | | 703/11 |
| 8,069,258 B1 | 11/2011 | Howell | |
| 8,154,553 B2 | 4/2012 | Peterfreund | |
| 8,559,798 B2 | 10/2013 | Sasaki et al. | |
| 8,678,929 B1 | 3/2014 | Nishimura et al. | |
| 8,873,636 B2 | 10/2014 | Iwasaki | |
| 8,952,962 B2* | 2/2015 | Son | G06T 15/005 |
| | | | 345/426 |
| 9,349,201 B1 | 5/2016 | Gault | |
| 9,358,466 B2 | 6/2016 | Kruglick | |
| 9,609,330 B2 | 3/2017 | Puri et al. | |
| 9,661,351 B2 | 5/2017 | Laan | |
| 9,665,334 B2 | 5/2017 | Iwasaki | |
| 9,697,280 B2 | 7/2017 | Maharajh et al. | |
| 9,705,526 B1 | 7/2017 | Veernapu | |
| 9,736,454 B2 | 8/2017 | Hannuksela et al. | |
| 9,749,642 B2 | 8/2017 | Sullivan et al. | |
| 9,762,911 B2 | 9/2017 | Puri et al. | |
| 9,762,919 B2 | 9/2017 | Cote et al. | |
| 9,774,848 B2 | 9/2017 | Jayant et al. | |
| 9,854,270 B2 | 12/2017 | Ramasubramonian et al. | |
| 9,906,816 B2 | 2/2018 | Toth et al. | |
| 9,967,590 B2 | 5/2018 | Ye et al. | |
| 10,000,961 B2 | 6/2018 | Elie et al. | |
| 10,000,963 B2 | 6/2018 | Pedersen et al. | |
| 10,021,411 B2 | 7/2018 | Su et al. | |
| 10,060,218 B2 | 8/2018 | Jandhyala et al. | |
| 10,078,631 B2* | 9/2018 | Bellegarda | G06F 40/274 |
| 10,271,055 B2 | 4/2019 | Kopietz | |
| 10,841,591 B2 | 11/2020 | Kopietz | |
| 2003/0078738 A1* | 4/2003 | Wouters | G16H 10/20 |
| | | | 702/22 |
| 2005/0108707 A1 | 5/2005 | Taylor | |
| 2005/0182582 A1 | 8/2005 | Chen | |
| 2006/0230428 A1 | 10/2006 | Craig et al. | |
| 2007/0047650 A1 | 3/2007 | Vilei et al. | |
| 2007/0061266 A1 | 3/2007 | Moore | |
| 2007/0094008 A1* | 4/2007 | Huang | G06F 40/53 |
| | | | 704/9 |
| 2007/0274245 A1 | 11/2007 | Balatsos et al. | |
| 2009/0279796 A1 | 11/2009 | Choi et al. | |
| 2010/0026880 A1 | 2/2010 | Ito et al. | |
| 2010/0278231 A1 | 11/2010 | Petersen et al. | |
| 2011/0221960 A1 | 9/2011 | Glaznev et al. | |
| 2011/0261885 A1 | 10/2011 | de Rivaz | |
| 2012/0212578 A1 | 8/2012 | Lee et al. | |
| 2013/0016107 A1 | 1/2013 | Dharmapurikar | |
| 2013/0063440 A1 | 3/2013 | Son et al. | |
| 2013/0111514 A1 | 5/2013 | Slavin et al. | |
| 2013/0212440 A1 | 8/2013 | Rom et al. | |
| 2013/0343450 A1 | 12/2013 | Solka et al. | |
| 2014/0368505 A1* | 12/2014 | Bavoil | G06T 15/005 |
| | | | 345/426 |
| 2014/0369421 A1 | 12/2014 | Zhu et al. | |
| 2015/0131969 A1 | 5/2015 | Tarakl | |
| 2015/0147052 A1* | 5/2015 | Zhou | H04N 19/86 |
| | | | 386/355 |
| 2015/0228106 A1 | 8/2015 | Laksono | |
| 2016/0092037 A1 | 3/2016 | Cesena et al. | |
| 2016/0198166 A1 | 7/2016 | Kudana et al. | |
| 2016/0255131 A1 | 9/2016 | Bulava | |
| 2017/0132830 A1 | 5/2017 | Ha et al. | |
| 2017/0155910 A1 | 6/2017 | Owen | |
| 2017/0200253 A1 | 7/2017 | Ling | |
| 2017/0278296 A1 | 9/2017 | Chui et al. | |
| 2017/0347126 A1 | 11/2017 | Shoa Hassani Lashdan | |
| 2017/0353516 A1 | 12/2017 | Gordon | |
| 2018/0117463 A1 | 5/2018 | Perry et al. | |
| 2018/0131841 A1 | 5/2018 | Mahmalat et al. | |
| 2018/0146197 A1 | 5/2018 | Yi et al. | |
| 2018/0205968 A1 | 7/2018 | Puri et al. | |
| 2018/0284872 A1* | 10/2018 | Schluessler | G06F 9/5083 |

FOREIGN PATENT DOCUMENTS

| | | |
|---|---|---|
| EP | 3123722 B1 | 8/2018 |
| JP | H6121518 A | 4/1994 |
| JP | H6129865 A | 5/1994 |
| JP | 2006014981 A | 1/2006 |
| JP | 2016111705 A | 6/2016 |
| KR | 20130029149 A | 3/2013 |
| KR | 20160067798 A | 6/2016 |
| KR | 20160087226 A | 7/2016 |
| KR | 20160142741 A | 12/2016 |
| RU | 2612624 C2 | 3/2017 |
| WO | 2009138878 A2 | 11/2009 |
| WO | WO-2009138879 A2 | 11/2009 |
| WO | WO-2015148380 A2 | 10/2015 |
| WO | WO 2016/105747 A1 | 6/2016 |
| WO | WO-2016172314 A1 | 10/2016 |
| WO | WO-2018102224 A1 | 6/2018 |

OTHER PUBLICATIONS

Moorthy, A.K., "Efficient Motion Weighted Spatio-Temporal Video SSIM Index," Human Vision and Electronic Imaging XV, vol. 7527, Mar. 2010, (<http://live.ece.utexas.edu/publications/2010/moorthy_spie_jan10.pdf>).

BGR Microsoft Article, http://bgr.com/2018/03/16/microsoft-netflix-for-games-subscription-cloud/.

Verge's Article on Blade Technology, https://www.theverge.com/2018/2/21/17029934/blade-shadow-us-launch-netflix-for-pc-games-cloud-streaming-windows-10.

Parsec TechCrunch Article, <https://techcrunch.com/2017/12/19/is-the-time-finally-right-for-platform-agnostic-cloud-gaming/>.

"Notice of Allowance Issued in Korean Patent Application No. 10-2019-7033911", dated Apr. 23, 2021, 5 Pages.

"Office Action Issued in Korean Patent Application No. 10-2019-7033911", dated Jan. 20, 2021, 13 Pages.

"Office Action Issued in Taiwan Patent Application No. 107113615", dated Apr. 16, 2019, 12 Pages. (w/o English Translation).

"Office Action Issued in Taiwan Patent Application No. 109110609", dated Nov. 16, 2020, 4 Pages. (w/o English Translation).

"Non Final Office Action Issued in U.S. Appl. No. 15/958,574", dated Sep. 27, 2018, 6 Pages.

"Final Office Action Issued in U.S. Appl. No. 16/355,200", dated Sep. 9, 2019, 6 Pages.

"Non Final Office Action Issued in U.S. Appl. No. 16/355,200", dated Apr. 18, 2019, 8 Pages.

"Extended European Search Report Issued in European Patent Application No. 18788388.9", dated Jan. 21, 2021, 17 Pages.

"Office Action Issued in United Kingdom Patent Application No. 1916964.8", dated Aug. 16, 2021, 2 Pages.

"Office Action Issued in Australian Patent Application No. 2018254570", dated Nov. 17, 2020, 5 Pages.

(56) References Cited

OTHER PUBLICATIONS

"First Office Action and Search Report Issued in Chinese Patent Application No. 201880041750.X", dated Jun. 16, 2021, 11 Pages.
"Notice of Allowance Issued in Russian Patent Application No. 2019136651", dated May 22, 2020, 21 Pages.
"Notice of Allowance Issued in Russian Patent Application No. 2020124345", dated Jan. 14, 2021, 22 Pages.
"Office Action Issued in Japanese Patent Application No. 2020-507500", dated Oct. 6, 2021, 8 Pages.
"Office Action Issued in Canadian Patent Application No. 3059743", dated Aug. 18, 2021, 5 Pages.
Kang, et al., "Non-RCE3: Implicit Derivation for Adaptively Turning Filtering off in Intra Prediction", In Meeting of Joint Collaborative Team on Video Coding (JCT-VC) of ITU-T SG 16, JCTVC-O0181-v3, Oct. 24, 2013, 14 Pages.
"International Search Report and Written Opinion Issued in PCT Application No. PCT/US18/028582", dated Jul. 3, 2018, 8 Pages.
"Office Action Issued in Indian Patent Application No. 201917046644", dated Feb. 18, 2022, 07 Pages.
"Notice of Allowance Issued in United Kingdom Patent Application No. 1916964.8", dated Jun. 24, 2022, 02 Pages.
"Notice of Allowance Issued in Japanese Patent Application No. 2020-507500", dated Apr. 19, 2022, 06 Pages.
"Office Action Issued in Canada Patent Application No. 3059743", dated Oct. 20, 2022, 3 Pages.
Notice of Allowance Issued in Canadian Patent Application No. 3059743, dated May 16, 2023, 1 Page.
Office Action Issued in European Patent Application No. 18788388.9, dated Jun. 15, 2023, 4 Pages.

\* cited by examiner

SYSTEMS AND METHODS FOR DEFERRED POST-PROCESSES IN VIDEO ENCODING

RELATED APPLICATIONS

This application is a continuation of U.S. patent application Ser. No. 16/355,200, filed Mar. 15, 2019, which is a continuation of U.S. patent application Ser. No. 15/958,574, filed Apr. 20, 2018, which claims the benefit of the following U.S. Provisional Applications: No. 62/488,526, filed Apr. 21, 2017, and No. 62/618,498, filed Jan. 17, 2018.

BACKGROUND OF THE INVENTION

Remote gaming applications, in which a server-side game is controlled by a client-side player, have attempted to encode the video output from a three-dimensional (3D) graphics engine in real-time using existing or customized encoders. However, the interactive nature of video games, particularly the player feedback loop between video output and player input, makes game video streaming much more sensitive to latency than traditional video streaming. Existing video coding methods can trade computational power, and little else, for reductions in encoding time. New methods for integrating the encoding process into the video rendering process can provide significant reductions in encoding time while also reducing computational power, improving the quality of the encoded video, and retaining the original bitstream data format to preserve interoperability of existing hardware devices.

Typical video rendering pipelines are separate and independent from video encoding pipelines, with little crossover between process and expertise in the two domains. As a result, some of the visual effects and post-processes applied in the video rendering pipeline are counterproductive to the video encoding process, leading to video artifacting, increased encoded video size, and longer encoding times. However, these visual effects are still desirable in the resultant decoded video.

By integrating video rendering and video encoding pipelines, post-process effects can be deferred to improve the encoding process. For example, simulated filmic grain introduces randomly-occurring animated grain that is difficult for typical encoders to process without a significant cost to video quality or compression ratio. Some video encoding methods attempt to remove this additional visual noise before encoding, but these methods are offline-only and computationally costly. By disabling this specific post-process in the rendering pipeline, the video automatically becomes easier to encode. The post-process can then be applied after the video is decoded. In the case of filmic grain, compositing the grain over the decoded video is not computationally demanding, can be done in real-time at the decoder, and may improve subjective video quality by disguising other encoding artifacts.

International Patent Application No. WO2016172314 A1 ("the 314 Application") discloses systems and methods directed to artistic intent based content coding. A coding user interface permits a user to specify an artistic set and to configure treatment of pixels and/or blocks associated with an artistic set, such as a fidelity enhancement, QP adjustment value and/or post-processing. Examples of artistic intent that may be added to video output include when an encoder may remove the film grain from the original signal before encoding and use the film grain SEI to convey to the decoder how to regenerate the film grain and add it back to the video signal before it is displayed. The present invention may be distinguished from the '314 Application at least because the '314 Application does not disclose disabling specific post-processes in the rendering pipeline prior to encoding and then applying those post-processes after the video is decoded. As a consequence, the present invention is an improvement to this computer technology because it offers improved encoding and decoding of video data without a significant cost to video quality or compression ratio. The present invention is also an improvement because it improves the resulting bandwidth, bitrate, encoding time, and is capable of being used in real-time video streaming applications with improved video quality.

U.S. Pat. No. 9,609,330 ("the '330 patent") discloses content adaptive entropy coding of modes and reference types data, meaning that a pre-analyzer subsystem of the encoder analyzes content to compute various types of parameters useful for improving video coding efficiency and speed performance. These parameters include horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, and film grain estimation. The parameters generated by the pre-analyzer subsystem can then be consumed by the encoder or be quantized and communicated to the decoder. The present invention may again be distinguished from the technology disclosed in the '330 Patent at least because that technology does not disable specific post-processes in the rendering pipeline prior to encoding and then apply those post-processes after the video is decoded. The present invention is therefore an improvement to the computer technology of the '330 Patent because it offers improved encoding and decoding of video data without significant a cost to video quality or compression ratio and because it is capable of being used in real-time video streaming applications with improved video quality.

U.S. Pat. No. 9,762,911 ("the '911 Patent"), discloses systems and methods for techniques related to content adaptive prediction and entropy coding of motion vectors. The technology disclosed allows for a first video data and second video data to be received for entropy encoding at an entropy encoder module. The first video data and the second video data may be different data types (e.g., header data, morphing parameters, synthesizing parameters, or global maps data or motion vectors or intra-prediction partition data or so on, as is discussed further herein). A first entropy encoding technique may be determined for the first video data based on a parameter associated with the first video data such as, for example, a number of compressed bits of the first video data, a predetermined indicator or flag associated with the first video data, a predetermined threshold, or a heuristically determined threshold or the like. In some examples, the first entropy encoding technique may be chosen from one of an adaptive symbol-run variable length coding technique or an adaptive proxy variable length coding technique. The first video data may be entropy encoded using the first entropy encoding technique and the second video data may be entropy encoded using the first entropy encoding technique. Once more, the present invention is distinguishable at least because the technology disclosed in the '911 Patent does not involve the selective disabling of post-processes in the rendering pipeline prior to encoding and then apply those post-processes after the video is decoded. Once again, the present invention is an improvement to the computer technology of the '911 Patent because it offers improved encoding and decoding of video data without a significant cost to video quality or compression ratio. The present invention is also an improvement because it improves the resulting bitrate, encoding time, and is capable of being used in real-time video streaming applications with improved video quality.

As is apparent from the above discussion of the state of art in this technology, there is a need in the art for an improvement to the present computer technology related to video encoding in game environments.

SUMMARY OF THE INVENTION

It is therefore an object of the exemplary embodiments disclosed herein to address disadvantages in the art and provide systems and methods for reducing latency and encoding times through techniques in which a server transmits an instruction to a client application to measure client hardware capability and transmits an instruction to a client application to sum a known load of one or more predetermined post-process deferral candidates to evaluate how many post-process deferral candidates are capable of being deferred to client hardware. At the client application, the post-process deferral list is compiled and built in reverse order. The server then receives the post-process deferral list, skips the list of deferred post-processes during the post-processing phase of a first video frame, and transmits an instruction to a client application to render an image.

It is another object of the invention to provide systems and methods for reducing latency and encoding times by having a client application perform a callback or poll to one or more operating system events to determine whether to re-measure the capability of the client hardware.

It is yet another object of the invention to provide systems and methods for reducing latency and encoding times by measuring the capability of the client hardware by detecting available instruction sets, memory, CPU, and/or GPU characteristics.

It is yet another object of the invention to provide systems and methods for reducing latency and encoding times by evaluating how many post-process deferral candidates are capable of being deferred to the client hardware by measuring frame rate and/or resource usage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
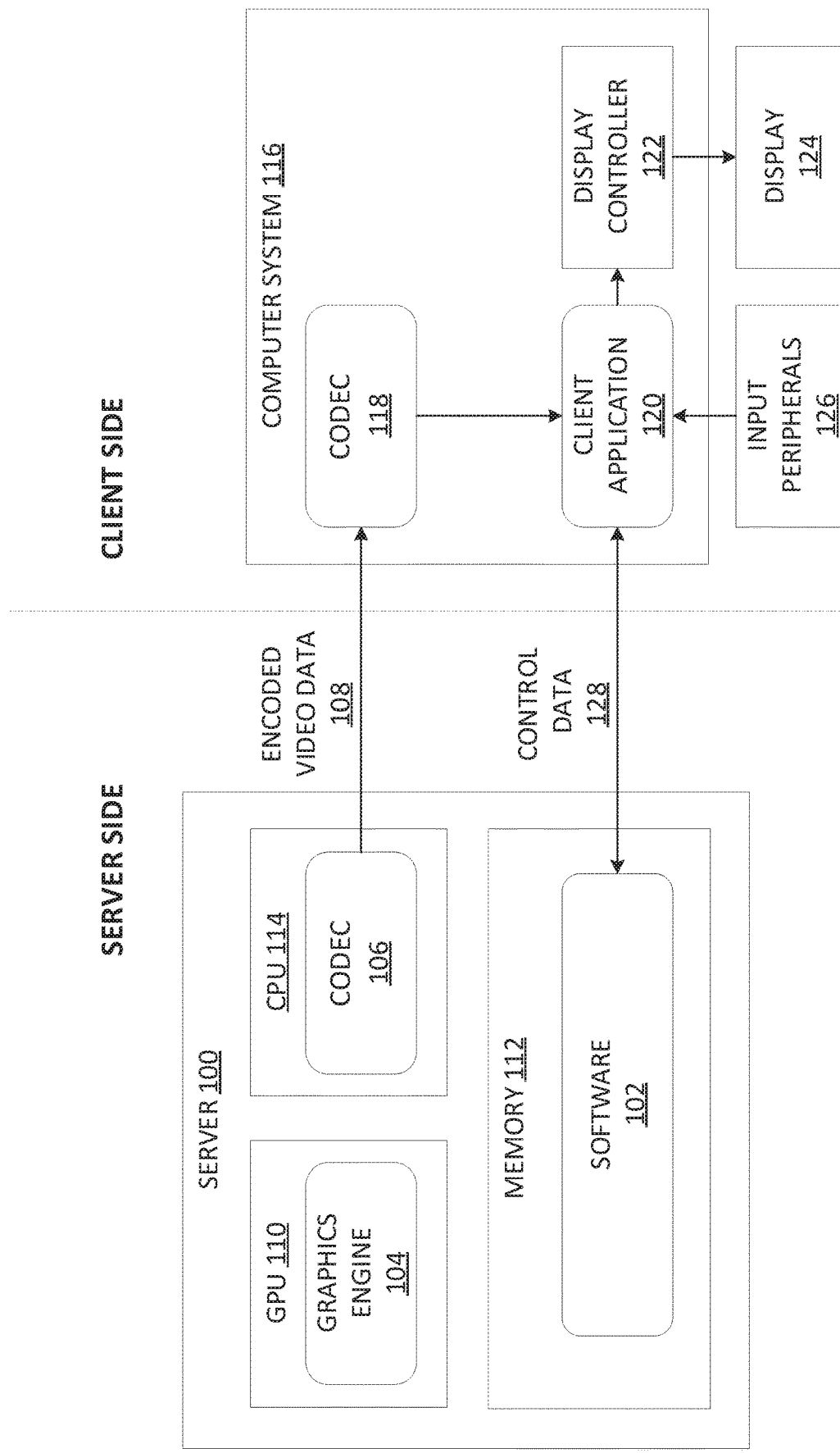
FIG. 1 is a block diagram illustrating an exemplary 3D graphics engine that renders a video for viewing on a remote client, in accordance with an embodiment of the invention.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Post-processing pipelines can perform many complex processes including anti-aliasing, motion blur, depth of field, color grading, bloom, filmic grain, chromatic aberration, vignetting, and tone mapping. Some of these effects are actively detrimental to the encoding processes, increasing encoding times and reducing compression ratios when compared to unprocessed frames. Waiting to apply certain post-processes until after a frame is decoded may increase subjective video quality and provide additional beneficial tradeoffs.

During the development of the client application, the balance between encoding time, bandwidth, and subjective quality should be evaluated for each post-process in the rendering pipeline to determine which post-processes are good candidates for deferral. The list of deferral candidates will be used by the client during runtime to determine which of the post-processes can be deferred onto the client.

Each post-process should be tested to measure its effects on the encoding process. First, a series of reference frames should be fed through the unaltered rendering and encoding pipelines and the encoding time and encoded frame size should be measured. The post-processes should be turned off one at a time in the rendering pipeline and the encoding time and encoded frame size should be compared to the control results. These measurements will help inform which post-processes are good candidates for deferral. Almost any post-process effect that increases image entropy, measured by an increased encoded frame size, would likely be a good candidate to defer. For example, a simulated filmic grain post-process adds random noise over an image leading to lower compression ratios. In certain situations, chromatic aberration and bloom may increase image entropy and result in lower compression ratios. Almost any post-process effect that reduces entropy or image data should not be deferred, as entropy reductions will reduce encoding overhead.

Post-processes that do not change the image entropy may be selected as deferral candidates to achieve secondary goals such as subjective video quality improvement or server load reduction. For example, color grading may not impact encoding time or bandwidth usage but may result in a measurable reduction in server-side computational load when deferred to the client. Similarly, anti-aliasing may improve subjective video quality and dramatically reduce server-side load when deferred. Additional testing should be performed to determine whether it is beneficial to defer entropy-neutral post-processes. For example, a similar testing procedure using reference frames can be used to compare server load before and after deferring an entropy-neutral post-process.

The client application should be able to run the post-processing calculations for each deferral candidate. Some code refactoring may be necessary to move these functions into the client application. Post-processes at the end of the rendering pipeline, such as filmic grain, chromatic aberration, or vignetting, are generally easier to move to the client application than those that occur earlier in the rendering pipeline such as anti-aliasing or depth of field. There may be some cases where deferring a post-process will cause it to be applied in non-linear space when it is typically applied in linear space, such as those post-processes that are applied before tone mapping like chromatic aberration, bloom, or vignetting. The process may be applied directly in gamma space and may not be mathematically correct, but the difference may be imperceptible to the viewer and overall subjective quality may be improved. Otherwise, at the cost of some client-side compute cycles and a loss of image quality, the client application can convert the image back into linear space, apply the post-process, then convert back to gamma space. Converting back to linear space will sacrifice some quality because the image will have been quantized and compressed during encoding. These subjective quality decisions should be made during the development of the client application.

All of the post-processes that the client application can perform form the basis of the deferral candidate list. The list of deferral candidates should be in the same order as they appear in the rendering pipeline in order to preserve any dependencies. Each deferral candidate in the list should also be paired with hardware feature requirements such as memory minimums or GPU requirements.

FIG. 1 illustrates an example system in which pixel-quality post-processes are deferred during video rendering. This example system represents a real-time remote game streaming application which, when compared to other types of video systems, benefits the most from the subjective quality improvements and reduced encoding times provided by deferring per-pixel quality processes. In this system, a server 100 hosts video game software 102 and a graphics engine 104 which renders video output. The video is encoded in a codec 106 and the encoded video data 108 is transmitted to a remote client. The server architecture 100 is any combination of hardware or software which can support the functions of both graphics engine 104 and the codec 106. In the given example, the graphics engine 104 may be implemented as, for example, a GPU 110 executing video game software 102 loaded into some computer readable memory 112, while the codec 106 (also referred to as the encoder) may be implemented as a CPU 114 running video encoding software.

The remote client computer system 116 is capable of running a client-side codec 118 to decode the transmitted encoded video data 108 and a client application 120 to apply the deferred pixel-quality post-processes. The client computer system 116 also contains a display controller 122 to drive display hardware 124. The input from the client-side input peripherals 126 will be converted by the client application 120 into control data 128 which is transmitted back to the game software 102 running on the server 100. Based on the specific implementation of deferred pixel-quality post-processing, some additional control data 128 may need to flow from the server-side software 102 to the client application 120 to ensure that the correct post-processes are applied for a given video frame.

Figure 2:
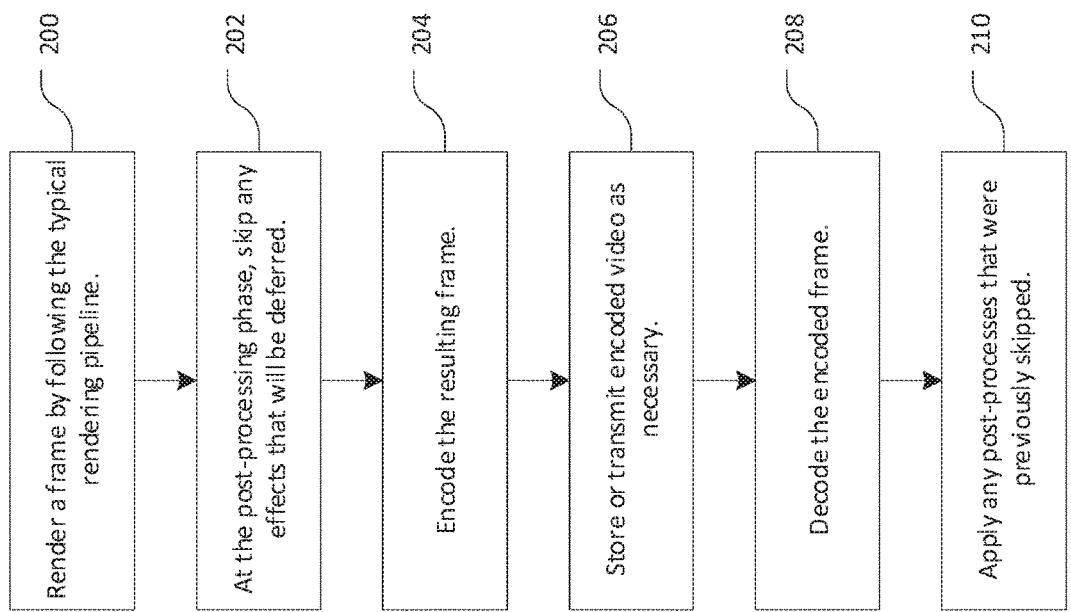
FIG. 2 is a flow diagram illustrating the exemplary steps required for improving encoding time or subjective video quality by deferring per-pixel post-processing, in accordance with an embodiment of the invention.

FIG. 2 illustrates the steps required to defer post-processing in a system that renders, encodes, and decodes video. At step 200, the rendering pipeline begins as usual at the server 100. There are no required changes to the rendering process before the post-processing phase.

Figure 4:
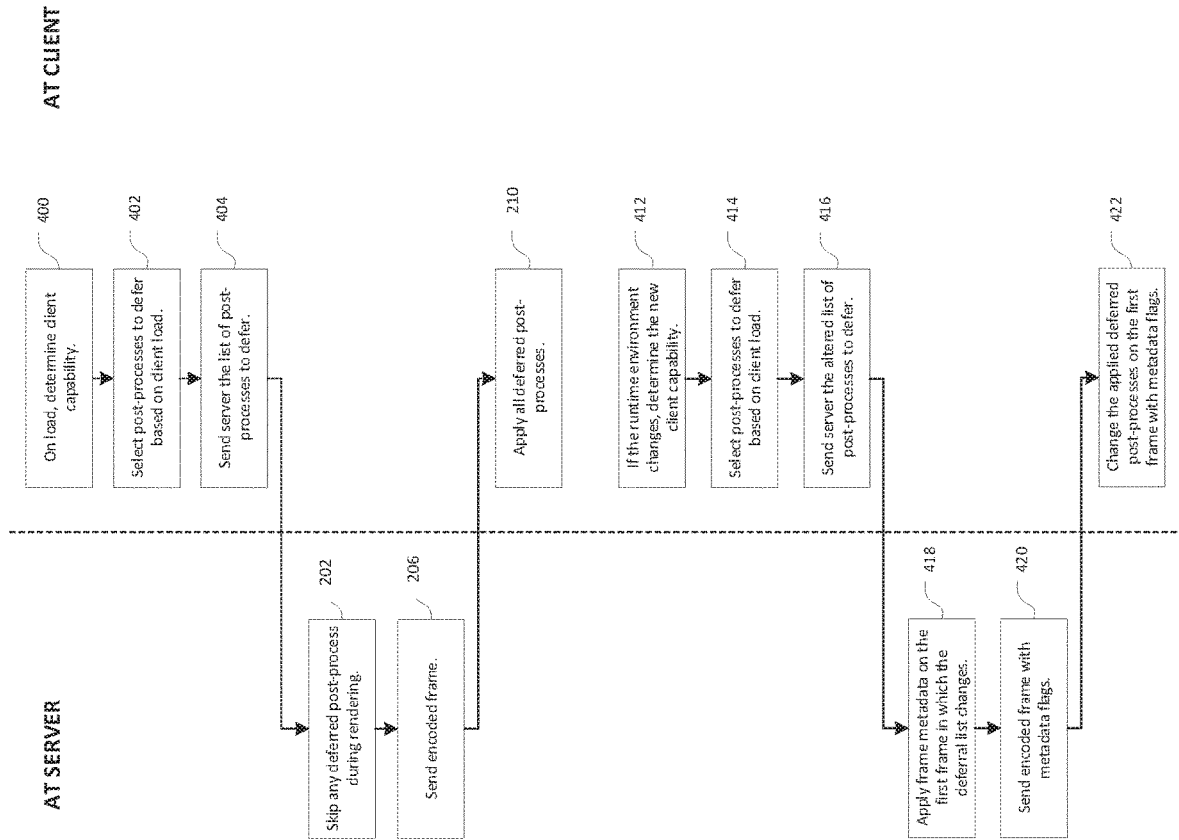
FIG. 4 is a flow diagram illustrating exemplary communication between a server and a client to sync the list of deferred post-processes, in accordance with an embodiment of the invention.

At step 202, at the video rendering post-processing phase at the graphics engine 104 of the server 100, any post-processes that will be deferred should be skipped. Any number of post-processes may be skipped if the client computer system 116 has the computational power required to apply all of the deferred post-processes. FIG. 4 describes in further detail how the server 100 determines which post-processes will be deferred. After skipping any deferred post-process, the rendering pipeline should continue until the frame is completely rendered.

At step 204, the resulting frame is encoded at the codec 106. Based on the selection of deferred post-processes, the encoding time may be faster and the encoded data may require less bandwidth. For example, if a filmic grain post-process is deferred, the codec 106 will have an easier time encoding the frame without the introduced noise.

At step 206, the encoded video data 108 is stored or transmitted to the remote client computer system 116, as necessary. In a real-time video game streaming application, as in the example from FIG. 1, the video data 108 will be immediately transmitted. In alternate embodiments of the system, the encoded video data 108 may be stored on a server 100 for on-demand streaming or stored on physical media.

At step 208, the encoded video is decoded at the codec 118 of the remote client computer system 116. No alterations need to be made to the decoding process.

At step 210, a software application will apply any post-processes that were deferred in the same order that they would appear in the rendering pipeline. This software, shown in FIG. 1 as the client application 120, may also need to receive control data 128 from the server 100 if the deferred post-processes change from frame to frame. The client application 120 may also need to send control data 128 if the video is interactive, as in video game streaming systems. The client application 120 may be sparse depending on the computational complexity requirements of the deferred post-processes, which may allow for a wider range of computational power at the client.

Figure 3:
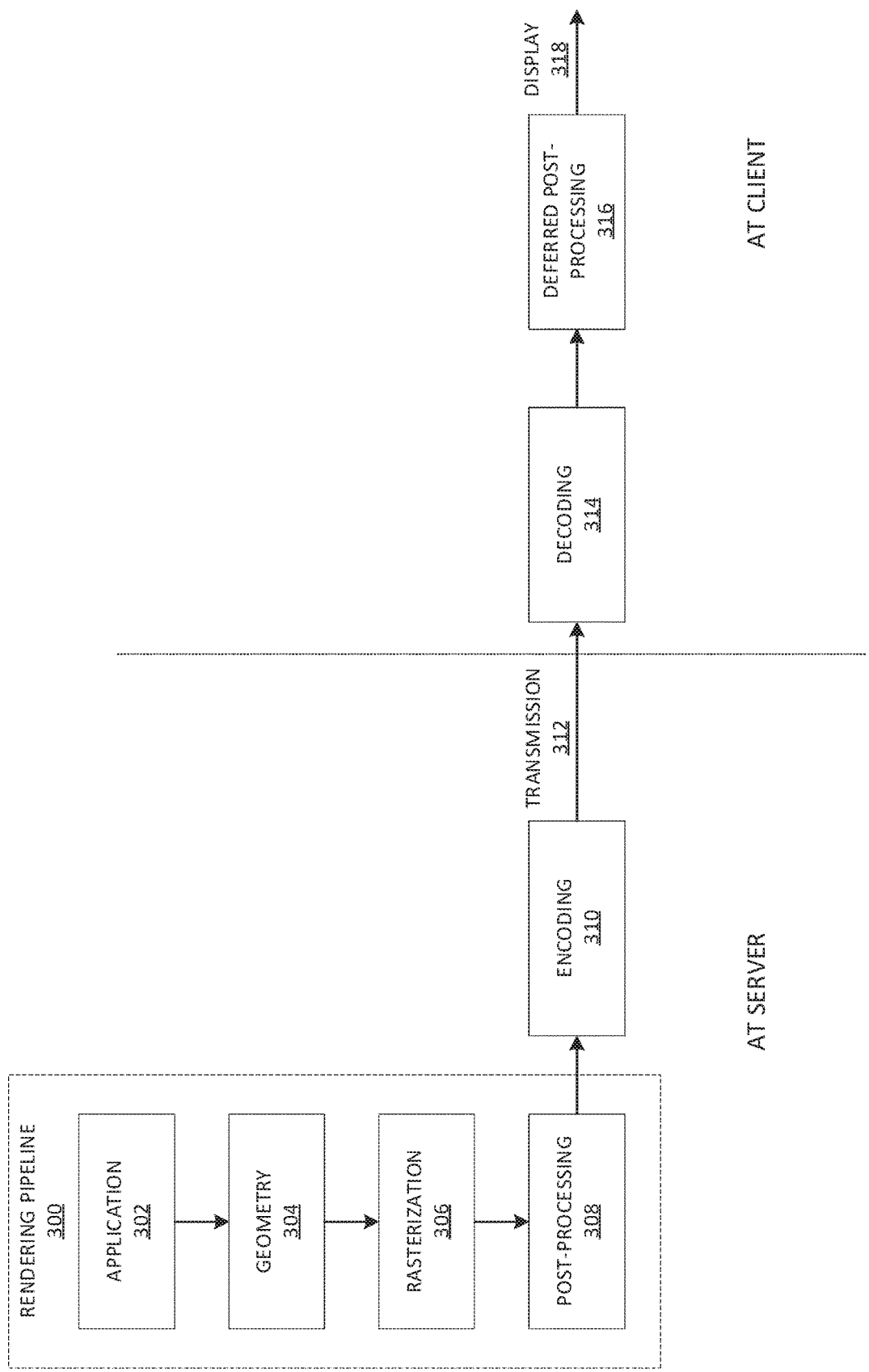
FIG. 3 is a diagram illustrating an exemplary minimal implementation of deferred per-pixel quality during video rendering, encoding, and decoding phases, in accordance with an embodiment of the invention.

FIG. 3 illustrates the implementation of deferred post-processing in the example system of FIG. 1. A typical 3D rendering pipeline, depicted at "RENDERING PIPELINE," step 300, located at the server 100, is comprised of "APPLICATION," step 302, "GEOMETRY," step 304, and rasterization phases, shown as "RASTERIZATION," step 306. The output of the rasterization phase at "RASTERIZATION," step 306, is a complete video frame, which is often enhanced by post-processing at "POST-PROCESSING," shown as step 308. Some post-processes are detrimental to encoding time or bandwidth during the encoding process at "ENCODING," step 310, and these post-processes are skipped at the post-processing phase at "POST-PROCESSING," step 308, if the client can apply them later. The remaining post-processes, the ones that are not deferred to the client 116, are applied as usual during post-processing at "POST-PROCESSING," step 308. The output video frame is encoded at "ENCODING," step 310 and transmitted at "TRANSMISSION," step 312.

When the client 116 receives the encoded video frame, it is decoded at "DECODING," step 314. At this point, all deferred post-processes are applied to the decoded frame at "DEFERRED POST-PROCESSING," step 316. In the case of filmic grain, for instance, an animated effect can be cached ahead of time and composited over the decoded frame with a relatively low computational cost. Real-time solutions already exist for color grading, dithering, and sharpening video and could be applied based on a client's computational power. The resulting video frame is displayed at "DISPLAY," step 318.

FIG. 4 illustrates a process by which the client application 120 builds the list of post-processes that will be deferred and communicates the list to the server 100.

At step 400, the client application 120 will measure the capability of the client hardware to determine which post-processes can be deferred onto the client 116. Client capability can be measured through feature detection for hardware information such as available instruction sets, memory, CPU, or GPU.

At step 402, the client application 120 reads the list of deferral candidates and discards any deferral candidates for which hardware requirements are not met by the client. The deferral candidate post-processes should be benchmarked on the client to measure real-time client performance. The deferral candidates are added one at a time to the benchmarking process until the client is no longer able to maintain desirable performance measured by frame rate, resource usage, or some other live measurement. Benchmarking can be done during client application installation, during the initial load of the client application 120, or on each load of the application.

The client 116 should do the post-processing for as many deferral candidates as possible. The deferral list is built in reverse order to keep the overall order of operations close to the original rendering pipeline order. For example, a mobile device may be capable of running only the last post-processes, a laptop may be capable of running the three post-processes at the end of the rendering pipeline, while a new desktop computer may be capable of running all post-processes in the deferral candidate list.

At step 404, the client 116 sends the list of post-processes to defer to the server 100.

At step 202, the server 100 uses the list of deferred post-processes during the post-processing phase of the first video frame. All post-processes on the deferral list are skipped.

At step 206, the encoded video data stream 108 starts transmitting to the client 116. Since the client 116 sent the deferral list before any frames were generated, no additional metadata needs to be sent from the server 100 to the client 116. The client 116 will automatically know which post-processes have been deferred.

At step 210, the client 116 applies all of the post-processes in the deferral list. The client 116 will continue to apply the deferred post-processes on future frames.

There may be scenarios in which the client capabilities change during runtime, requiring the list of deferred post-processes to change. For example, if the client application is running on a mobile device that just entered battery-saving mode, the client may wish to shrink the list of deferred post-processes. In this example, the client application would need to register a callback or poll the operating system ("OS") events in order to listen for changes in battery state. At step 412, the client application 120 responds to a recent environment change by re-measuring the client capability. An environmental change may be any change that affects the hardware performance of the remote client computer system 116. For the above example, the battery saving mode will reduce the clock rate by a multiplier which can be fetched directly. The change in clock rate multiplier may provide a rough estimate for the change in client capability. Otherwise, an additional benchmark in the battery-saving mode may be added to the benchmark phase described at step 402.

If the client capability has changed, the client application 120 will reevaluate which post-processes can be deferred at step 414. In the battery-saving mode example, the deferral list may shrink in proportion to the change of the clock rate multiplier. For example, if battery-saving mode reduces the clock rate by 50%, the deferral list will shrink by at least half. If the client 116 was deferring four post-processes, it will shrink the list down to two post-processes. Otherwise, if a battery-saving mode benchmark has previously been performed, the deferral list will already be known.

If the deferral list is changed, the client 116 will send the altered deferral list to the server 100 at step 416. The client 116 will continue to apply the post-processes from original deferral list until it receives a message from the server 100, which is preferably comprised of a different list of deferred post-processes.

At step 418, the server 100 applies the altered deferral list on the next available frame. In order to sync with the client 116, some metadata is applied to this frame.

At step 420, the frame of encoded video data 108 is sent with its corresponding metadata.

The client waits until it receives the metadata flag. At step 422, the client 116 begins processing frames according to the altered deferral list. The client 116 will continue to apply the deferred post-processes according to the altered deferral list. If the runtime environment changes again, the deferral list can grow or shrink again, starting from step 412. If the deferral list shrinks due to a temporary runtime environment change, such as the battery saving mode on a mobile device, the client application 120 should grow the deferral list at the earliest opportunity such that the maximum possible post-processes are deferred at any given time.

EXAMPLE 1

Benchmark Test Results

Filmic grain introduces randomly-occurring visual noise that causes a significant impact on the encoder's compression ratio. Applying post-processes such as filmic grain on the client side will result in smaller encoded frame sizes.

Experimental bitrate values were taken while the graphics engine was producing output at a resolution of 1280×720 at 60 frames per second and averaged over 60 frames to find an average bitrate. The measured values compare the bitrate of a video stream where filmic grain is applied at the server-side to the bitrate of a video stream where filmic grain is deferred to the client. These measurements are repeated for three different sizes of filmic grain and for two encoder quality settings values. Filmic grain 1 represents the smallest grain size while filmic grain 3 represents the largest grain size. The experimental results are reproduced in Tables 1 and Table 2 below. Table 1 shows the results using an encoder quality of 16, while Table 2 shows the results using an encoder quality of 20.

TABLE 1

| Bitrate Results at an Encoder Quality Setting of 16 | | |
|---|---|---|
| Encoder Quality = 16 | Server-Side Filmic Grain | Deferred Filmic Grain |
| Filmic Grain 1 | 550 KByte/s | 270 KByte/s |
| Filmic Grain 2 | 1700 KByte/s | 270 KByte/s |
| Filmic Grain 3 | 1900 KByte/s | 270 KByte/s |

TABLE 2

Bitrate Results at an Encoder Quality Setting of 20

| Encoder Quality = 20 | Server-Side Filmic Grain | Deferred Filmic Grain |
|---|---|---|
| Filmic Grain 1 | 150 KByte/s | 140 KByte/s |
| Filmic Grain 2 | 270 KByte/s | 140 KByte/s |
| Filmic Grain 3 | 520 KByte/s | 140 KByte/s |

Based on experimental results, it is apparent that post processes such as filmic grain result in larger encoded frame sizes, which is undesirable. These negative effects are more apparent at higher encoder quality values and become even more apparent as the amount of introduced noise increases. However, by deferring filmic grain to the client, dramatic reductions in bitrate can be achieved, as shown in Tables 1 and 2, where the bitrate is reduced to 270 Kbyte/s and 140 Kbyte/s, respectively. Regardless of the amount of introduced noise, as measured by the size of the filmic grain in these experiments, the bitrate remains stable for a given encoder quality.

Similarly, as shown in Table 3 below, experimental encoding times were measured while the graphics engine was producing output at a resolution of 1280×720 at 60 frames for several encoder quality settings. The measured values compare the encoding times for a video stream where filmic grain is applied at the server-side to the encoding time of a video stream where filmic grain is deferred to the client. The size of the filmic grain remains fixed across all measurements. As is apparent from Table 3, the reductions in encoding times applying the techniques discussed herein are more apparent at higher encoder quality settings.

TABLE 3

Latency Results Across Encoder Quality Settings

| Encoder Quality | Server-Side Filmic Grain | Deferred Filmic Grain |
|---|---|---|
| 15 | 16 ms | 10 ms |
| 17 | 15 ms | 10 ms |
| 20 | 11 ms | 9 ms |
| 25 | 9 ms | 7 ms |
| 40 | 9 ms | 7 ms |

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A computer-implemented method for deferring post-processes from before video encoding to after video decoding, the method comprising:
transmitting, from a server implemented at a first computer system, an instruction to a remote client to provide information that indicates a post-process deferral list of one or more post-processes among one or more predetermined post-process deferral candidates, the remote client being implemented at a second computer system that is different than, and remote from, the first computer system;
receiving, from the remote client, the information that indicates the post-process deferral list, each of the one or more post-processes in the post-process deferral list being capable of running at the remote client after decoding of video instead of running at the server before encoding of the video; and
at the server, skipping the one or more post-processes in the post-process deferral list during a post-processing phase for a first video frame of the video before encoding of the first video frame.

2. The computer-implemented method of claim 1, further comprising transmitting, from the server to the remote client, control data for the one or more post-processes skipped at the server.

3. The computer-implemented method of claim 1, wherein the server skips the one or more post-processes in the post-process deferral list based on the remote client's computational power.

4. The computer-implemented method of claim 3, further comprising monitoring for changes to the remote client's computational power.

5. The computer-implemented method of claim 1, further comprising encoding the first video frame.

6. A server computer system for deferring post-processes from before video encoding to after video decoding, wherein a server of the server computer system is configured to perform operations comprising:
transmitting an instruction to a remote client to provide information that indicates a post-process deferral list of one or more post-processes among one or more predetermined post-process deferral candidates, the remote client being implemented at a remote client computer system different than the server computer system;
receiving, from the remote client, the information that indicates the post-process deferral list, each of the one or more post-processes in the post-process deferral list being capable of running at the remote client after decoding of video instead of running at the server before encoding of the video; and
skipping the one or more post-processes in the post-process deferral list during a post-processing phase for a first video frame of the video before encoding of the first video frame.

7. The server computer system of claim 6, wherein the operations further comprise transmitting, from the server to the remote client, control data for the one or more post-processes skipped at the server.

8. The server computer system of claim 6, wherein the server is configured to skip the one or more post-processes in the post-process deferral list based on the remote client's computational power.

9. The server computer system of claim 8, wherein the operations further comprise monitoring for changes to the remote client's computational power.

10. The server computer system of claim 6, wherein the operations further comprise encoding the first video frame.

11. The server computer system of claim 6, wherein the server is a gaming server, and wherein the remote client is a gaming client.

12. A computer-implemented method for deferring post-processes from before video encoding to after video decoding, the method comprising:
at a server implemented at a first computer system, identifying one or more post-processes for deferral, each of the one or more post-processes being capable of running at a remote client after decoding of video instead of running at the server before encoding of the video;

at the server, skipping the one or more identified post-processes during a post-processing phase of a rendering pipeline for one or more frames of the video;

at the server, encoding the one or more frames of the video from the rendering pipeline with an encoder into one or more encoded video frames; and from the server, transmitting the one or more encoded video frames to the remote client, the remote client being implemented at a second computer system that is different than, and remote from, the first computer system.

13. The computer-implemented method of claim 12, further comprising re-identifying the one or more post-processes for deferral.

14. The computer-implemented method of claim 13, wherein the re-identifying of the one or more post-processes is determined based on temporary runtime environment changes.

15. The computer-implemented method of claim 12, further comprising compiling the one or more post-processes for deferral into a deferral list.

16. The computer-implemented method of claim 15, further comprising transmitting the deferral list to the remote client.

17. A server computer system for deferring post-processes from before video encoding to after video decoding, wherein a server of the server computer system is configured to perform operations comprising:

at the server, identifying one or more post-processes for deferral, each of the one or more post-processes being capable of running at a remote client after decoding of video instead of running at the server before encoding of the video;

at the server, skipping the one or more identified post-processes during a post-processing phase of a rendering pipeline for one or more frames of the video;

at the server, encoding the one or more frames of the video from the rendering pipeline with an encoder into one or more encoded video frames; and from the server, transmitting the one or more encoded video frames to the remote client, the remote client being implemented at a remote client computer system different than the server computer system.

18. The server computer system of claim 17, wherein the operations further comprise re-identifying the one or more post-processes for deferral.

19. The server computer system of claim 18, wherein the re-identifying of the one or more post-processes is determined based on temporary runtime environment changes.

20. The server computer system of claim 17, wherein the operations further comprise compiling the one or more post-processes for deferral into a deferral list.

21. The server computer system of claim 20, wherein the operations further comprise transmitting the deferral list to the remote client.

22. The server computer system of claim 17, wherein the server is a gaming server, and wherein the remote client is a gaming client.

* * * * *